US007578588B2

(12) United States Patent
Greiser

(10) Patent No.: US 7,578,588 B2

(45) Date of Patent: Aug. 25, 2009

(54) DEVICE FOR ACCURATE POSITIONING OF AN OBJECT ON A FRAME

(75) Inventor: Siegbert H. Greiser, Nijmegen (NL)

(73) Assignee: Océ Technologies B.V., Venlo (NL)

( * ) Notice: Subject to any disclaimer, the term of this patent is extended or adjusted under 35 U.S.C. 154(b) by 350 days.

(21) Appl. No.: 11/081,751

(22) Filed: Mar. 17, 2005

(65) Prior Publication Data

US 2005/0206714 A1 Sep. 22, 2005

(30) Foreign Application Priority Data

Mar. 18, 2004 (NL) .................................. 1025754

(51) Int. Cl.

| | |
|---|---|
| ***B41J 29/13*** | (2006.01) |
| ***B41J 2/385*** | (2006.01) |
| ***G03G 13/04*** | (2006.01) |
| ***B41J 2/41*** | (2006.01) |
| ***G01D 15/28*** | (2006.01) |
| ***G03G 15/00*** | (2006.01) |
| ***G01D 15/06*** | (2006.01) |
| ***B41J 2/325*** | (2006.01) |

(52) U.S. Cl. ....................... 347/108; 347/138; 347/152; 347/170; 347/222

(58) Field of Classification Search ................. 347/108, 347/138, 152, 170, 222; 400/691; 346/145
See application file for complete search history.

(56) References Cited

U.S. PATENT DOCUMENTS 2,255,339 A * 9/1941 Thompson .................. 347/262
2,419,316 A * 4/1947 Engemann ............... 123/90.62
2,797,930 A * 7/1957 Booth ................. 280/124.134
2,830,833 A * 4/1958 Alldredge et al. ........... 403/126
3,059,950 A * 10/1962 Hedges ........................ 403/74
4,083,545 A * 4/1978 Herbenar .................... 267/266
4,292,679 A * 9/1981 Kondo et al. ................ 367/188
4,308,543 A * 12/1981 Shultz ......................... 347/38
4,662,567 A * 5/1987 Knapp ..................... 239/585.4
4,875,153 A * 10/1989 Hons .......................... 347/137
4,901,095 A * 2/1990 Perra et al. .................... 347/20
5,245,364 A * 9/1993 Uchida et al. ............... 347/104
5,548,311 A 8/1996 Hine
5,646,658 A 7/1997 Thiel et al.

(Continued)

FOREIGN PATENT DOCUMENTS

SU 1763271 A1 * 10/1990

*Primary Examiner*—Stephen D Meier
*Assistant Examiner*—Leonard S Liang
(74) *Attorney, Agent, or Firm*—Birch, Stewart, Kolasch and Birch, LLP

(57) ABSTRACT

A device for positioning an object in an opening of a frame in a predetermined position with respect to a plane extending in the direction of the plane of the frame (plane X-Y), wherein the object includes a first spherical segment at a first side and a second spherical segment at a second side situated opposite the first side, wherein at least one positioning means which, after placing the object, exerts a force with a component in the radial and tangential direction on the object at the first spherical segment, the tangential component reaching a minimum in the situation in which the object is situated in the predetermined position, and a recess in which the second spherical segment can be pressed by the positioning means.

20 Claims, 7 Drawing Sheets

U.S. PATENT DOCUMENTS

| | | | | |
|---|---|---|---|---|
| 5,746,520 | A * | 5/1998 | Kohira | 400/120.01 |
| 6,046,759 | A * | 4/2000 | Kim | 347/263 |
| 6,145,980 | A * | 11/2000 | Wang | 347/104 |
| 6,278,471 | B1 * | 8/2001 | Uchiyama et al. | 347/138 |
| 6,387,184 | B1 * | 5/2002 | Gibson et al. | 118/323 |
| 6,609,850 | B2 * | 8/2003 | Greb et al. | 403/137 |
| 6,767,153 | B1 * | 7/2004 | Holbrook | 403/56 |
| 7,344,237 | B2 * | 3/2008 | Fukuda et al. | 347/100 |

* cited by examiner

DEVICE FOR ACCURATE POSITIONING OF AN OBJECT ON A FRAME

BACKGROUND OF THE INVENTION

This non-provisional application claims priority under 35 U.S.C. § 119(a) on Patent Application No. 1025754, filed in the Netherlands on Mar. 18, 2004, which is herein incorporated by reference.

The present invention relates to a device for positioning an object in an opening of a frame in a predetermined position with respect to a plane extending in the direction of the plane of the frame (plane X-Y).

A device of this kind is known from American patent U.S. Pat. No. 5,646,658 in which the outer surfaces of an ink cartridge are pressed against a specific surface of a frame, the ink cartridge being pressed on the frame in directions perpendicular to the frame and in the direction of the length of the cartridge by means of springs situated on opposite surfaces of the frame. The cartridge can be aligned by means of spacers and setscrews extending in directions parallel to the frame and perpendicular to the direction of the length of the cartridge.

The disadvantage of this device is that a plurality of actions have to be carried out by an end user, and only after the cartridge has been located between a first spring and the frame can a second spring be placed on the frame positioned on the opposite side of the first spring. After the second spring has been applied, at least three screws have to be tightened to align the cartridge in the Y-direction.

SUMMARY OF THE INVENTION

The object of the present invention is to provide a device which obviates the disadvantages of the prior art.

To this end, a device has been invented wherein the object comprises a first spherical segment at a first side and a second spherical segment at a second side situated opposite the first side, and a frame, wherein at least one positioning means which, after placing the object, exerts a force with a component in the radial and tangential direction on the object at the first spherical segment, the tangential component reaching a minimum in the situation in which the object is situated in a predetermined position, and a recess in which the second spherical segment can be pressed by the positioning means.

By means of the present invention an interchangeable object can initially be mounted inaccurately in a frame provided with positioning means. After the object has been placed, the positioning means can exert a force on the object in such a manner that the object is moved accurately to the predetermined position. At this position the force in the direction of movement will reach its minimum and the positioning means will hold the object accurately in this position.

It will be clear that according to this principle the positioning means can also be mounted on the object for positioning. This can be applied in an alternative embodiment wherein the frame includes a first spherical segment on a first side and a second spherical segment on a second side situated opposite the first side and the object which includes a positioning means which, after placing the object exerts a force with a component in the radial and tangential direction on the object at the first spherical segment, the tangential component reaching a minimum in the situation in which the object is situated in the predetermined position, and a recess in which the second spherical segment is pressed by the positioning means.

In another embodiment, the frame is provided with auxiliary means to prevent movement of the object in the direction of the height (Z-direction). In this way, after positioning, the object cannot work loose from the frame in dynamic surroundings and mechanical stability is achieved.

In one embodiment, the positioning means is a resilient element such as a curved leaf spring. This can deliver a force in opposition to the direction of the deviation, so that the spring delivers a force in the direction required to move the object in the predetermined position. A curved leaf spring has the additional property that in addition to the directing force as described above it can also deliver a force, which can press the object into the frame recess.

Another embodiment of the present invention includes a symmetrically shaped curved leaf spring, which encloses more than half of an arc of a circle. By selecting a symmetrical leaf spring, the directing force will always be the direction of predetermined equilibrium of said spring. By this selection of a curved leaf spring enclosing more than half of an arc of a circle, a correcting movement to the predetermined position can be achieved in the event of skewing after introduction of the object.

In one embodiment of the present invention, the positioning means forms a unit with the frame and is formed by machining from the same work piece. This has advantages in the production of the whole device. By making the whole device from the same basic material, the whole frame including the positioning means can be made in one operation. This also has a positive influence on the elastic loadability of the connection between the positioning means and the frame.

One advantage of an application of the device according to the present invention as described hereinbefore is that a printer provided with a carriage can be provided for positioning a printhead in an opening in the carriage frame in a predetermined position with respect to a plane extending in the direction of the plane of the carriage (plane X-Y). The printhead contains a first spherical segment at a first side and a second spherical segment at a second side situated opposite the first side, and the carriage frame, contains at least one positioning means which, after placing the object therein, exerts a force with a component in the radial and tangential direction on the printhead at the first spherical segment, the tangential component reaching a minimum in the situation in which the printhead is situated in the predetermined position. Also, a recess is provided in which the second spherical segment can be pressed by the positioning means.

The principle of the invention can advantageously be applied in this construction since accuracy in the positioning of a printhead finds direct expression in the quality of a print on a substrate. The location of a printhead in practice frequently does not take place in an accurately controlled environment in which very high location accuracies can be obtained, but is frequently carried out by end users. By means of the present invention, the positioning accuracies required for high print quality can nevertheless be obtained by means of the invention via this uncontrolled placing of the interchangeable printhead on a carriage.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will now be explained in detail with reference to examples illustrated in the following drawings, wherein.

DETAILED DESCRIPTION OF THE INVENTION

Figure 1:
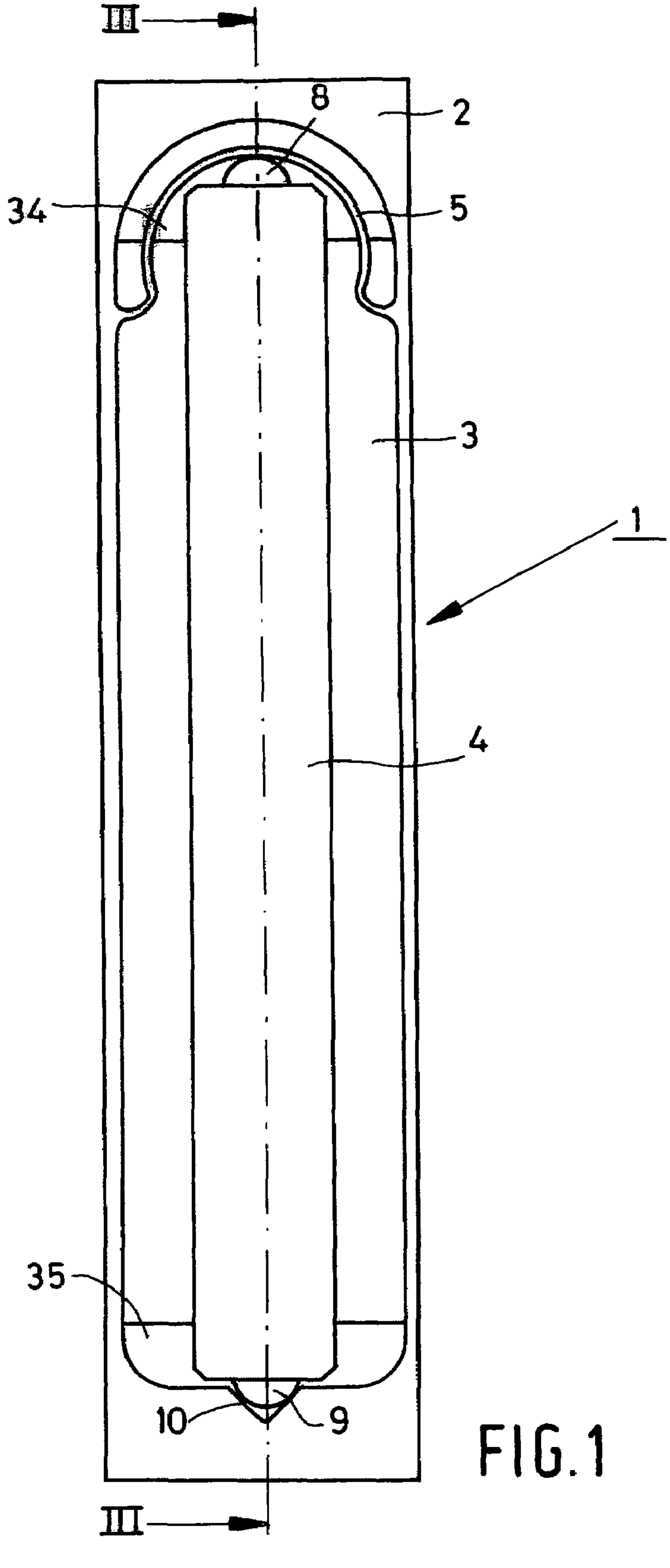
FIG. 1 is a top plan view of a device according to the present invention.
Figure 2:
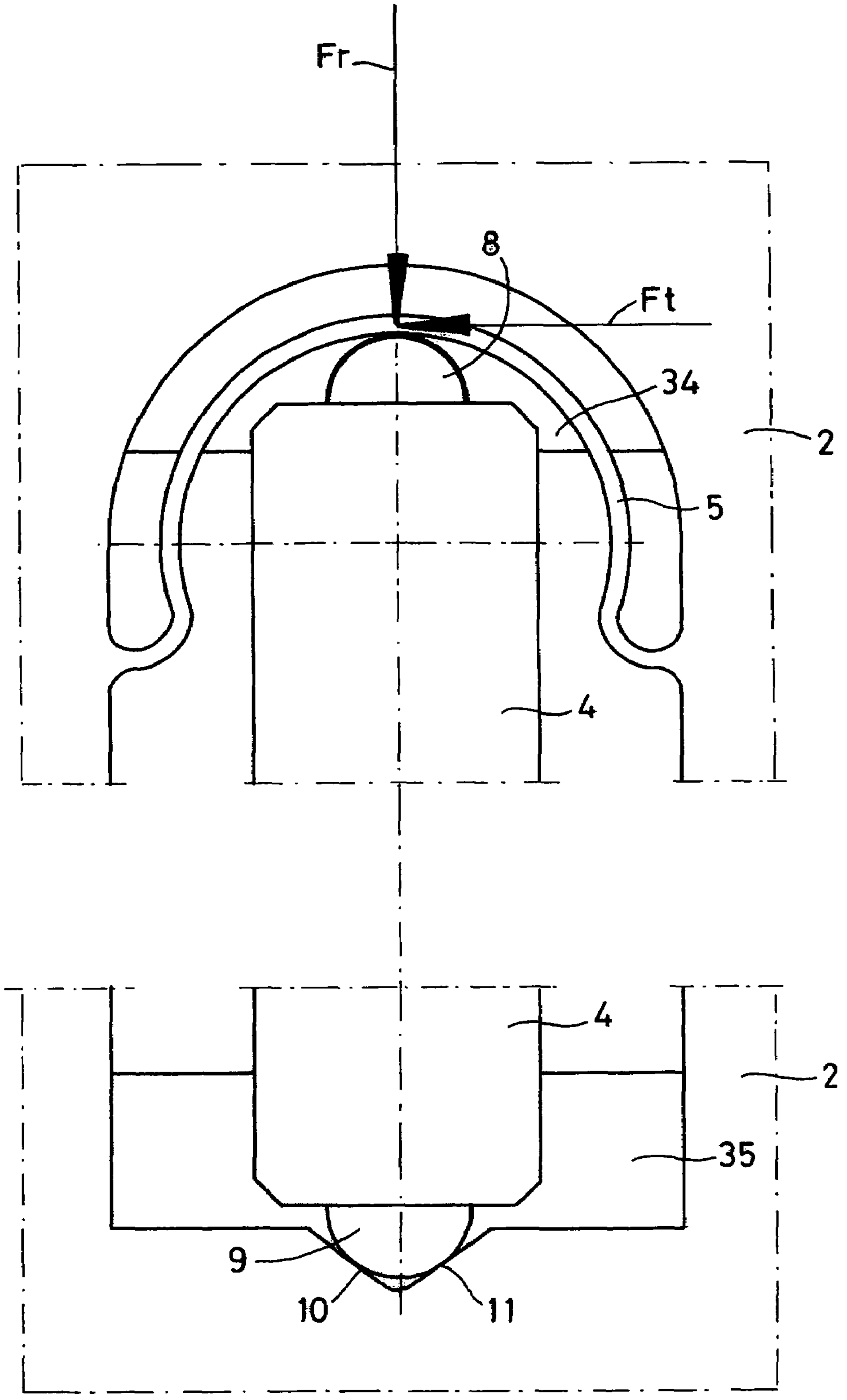
FIG. 2 is a truncated enlargement of the device of FIG. 1 in a top plan view.
Figure 3:
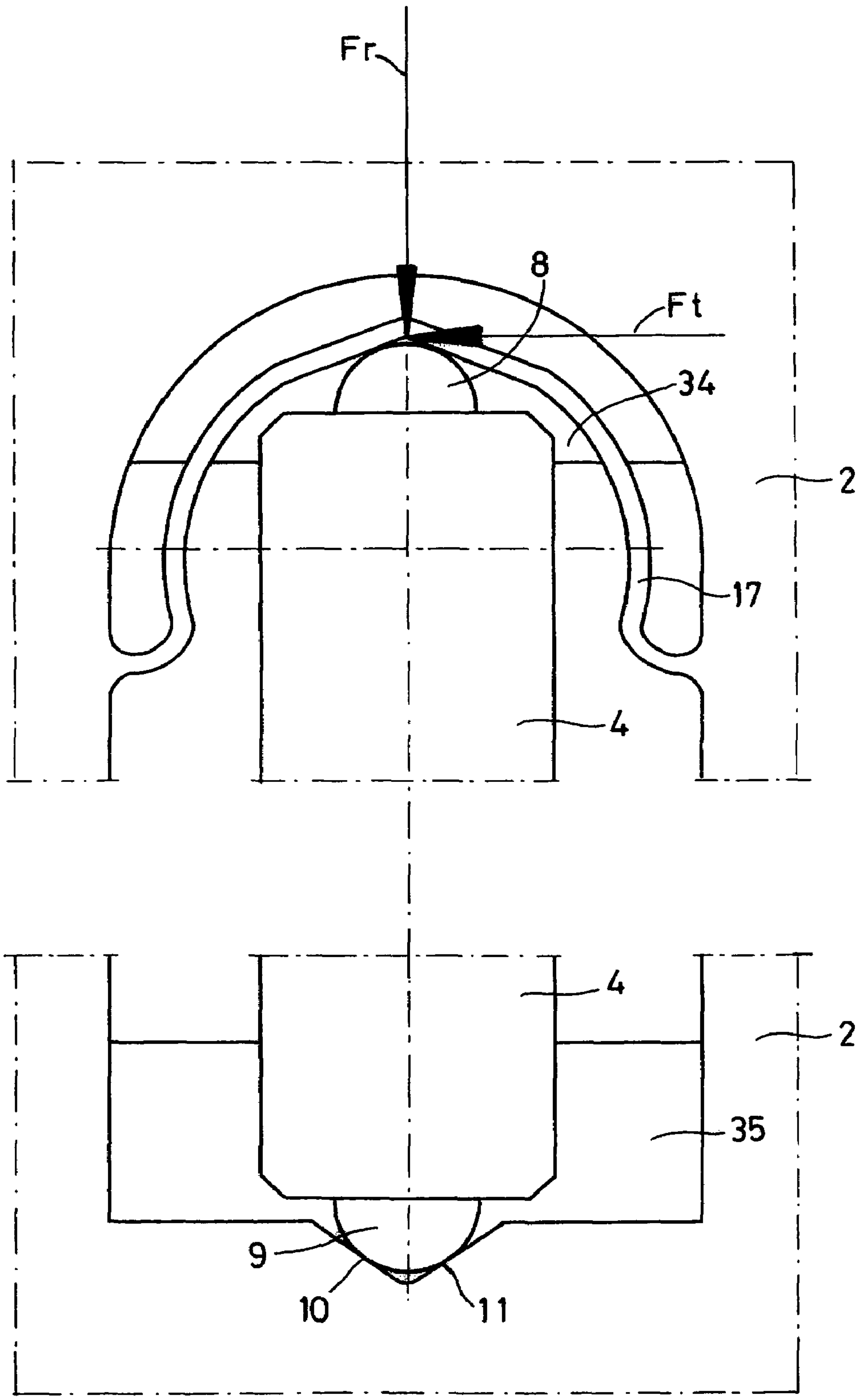
FIG. 3 is a truncated enlargement of another embodiment according to the present invention in a top plan view.

FIGS. 1, 2 and 3 are top plan views of a device 1 according to the present invention, in which an object 4 is accurately positioned on a base frame 2. The device 1 includes a slot 3 in which the object 4 can be placed. The device 1 contains parts which cause the object 4 to be accurately positioned in the slot 3 with respect to the base frame 2 relative to all six of the degrees of freedom of the object 4, namely three translatory movements (in the X, Y and Z directions) and three rotational movements (about the three aforesaid axes in the X, Y and Z directions, which are perpendicular to one another). The device 1 is provided with parts for releasably connecting the object 4 to the base frame 2. In order to meet the requirements of reproducibility and accuracy, each degree of freedom is precisely fixed once in the construction.

For this purpose, the base frame 2 is provided, at the top of the slot 3, with a symmetrically shaped leaf spring 5. This leaf spring is symmetrical in the plane extending perpendicularly out of the drawing plane and through the line III-III. This leaf spring 5 can, for example, be made by the use of spark erosion. After spark erosion of the basic shape of the slot 3 from a metal base plate, the spaces around the leaf spring 5, in the same plate of base material, are eroded by spark erosion. In this process, surrounding material can be removed with high precision, leaving a very accurate, symmetrically shaped leaf spring 5.

FIGS. 1 and 2 show an embodiment in which the leaf spring 5 is constructed to be arcuate, and in FIG. 3 straight elements are added to the leaf spring 17.

As shown in FIGS. 1, 2 and 3, the object 4 is provided with spherical segments 8 and 9 at both extreme contact sides. These spherical segments are, in this case, constructed in the form of balls pressed into the object 4, but they can also be made by making the object side spherical, cylindrical or barrel-shaped for example. Some examples of this are shown in FIGS. 5*a-d*, in which, respectively, a ball 81, a horizontal locating pin 82, a barrel-shaped object 83, and a vertical locating pin 84 are pressed in.

The V-groove 6 is in contact with the object 4 via the bottom of the spherical segment 9 with two contact points 10, 11 as shown in FIGS. 1, 2 and 3. These contact points will deform under load to give a contact surface. The extent of the deformation depends on the material and constructional properties of the embodiment. Hereinafter, these locations will be referred to as contact points. By introducing the object 4 into the slot 3, spherical segment 8 of the object 4 will be positioned against the leaf spring 5, the latter being deformed so that a force is exerted by the leaf spring 5 on the object 4 with directional components in both the radial and the tangential direction of the arcuate segment of the leaf spring 5. The radial component of the spring force, indicated by Fr in FIGS. 2 and 3, is provided by the radial deflection of the leaf spring 5 by the spherical segment 8 at the point contact with the leaf spring 5 and is proportional to the stiffness of the leaf spring 5. This radial spring force will press spherical segment 9 into the V-groove 6, where contact with the base frame 2 is formed by two point contacts. The tangential component, indicated by Ft in FIGS. 2 and 3, arises from the configuration of the leaf spring 5. As a result of the symmetrical construction of the leaf spring 5 and the choice of an arcuate segment enclosing more than 180° of an arc of a circle, a directing force is delivered which presses the center line of the object 4 precisely in the plane through the line III-III and hence aligns it with respect to the base frame 2. If the object 4 is not placed correctly in alignment, a force component in the tangential direction opposed to the direction of the alignment error will be produced. The leaf spring 5 will rotate the object 4 about the spherical segment 9 in the V-groove 6 until the tangential force component has vanished. This will occur when the object 4 is aligned in the direction of the length on the line through the axis of symmetry of the V-groove 6 and the axis of symmetry of the leaf spring 5, which is indicated by the line III-III in FIG. 1. The object 4 is accurately positioned by these components in the plane of the base frame 2 in translation and rotation, free of the six degrees of freedom being clearly fixed.

Figure 4:
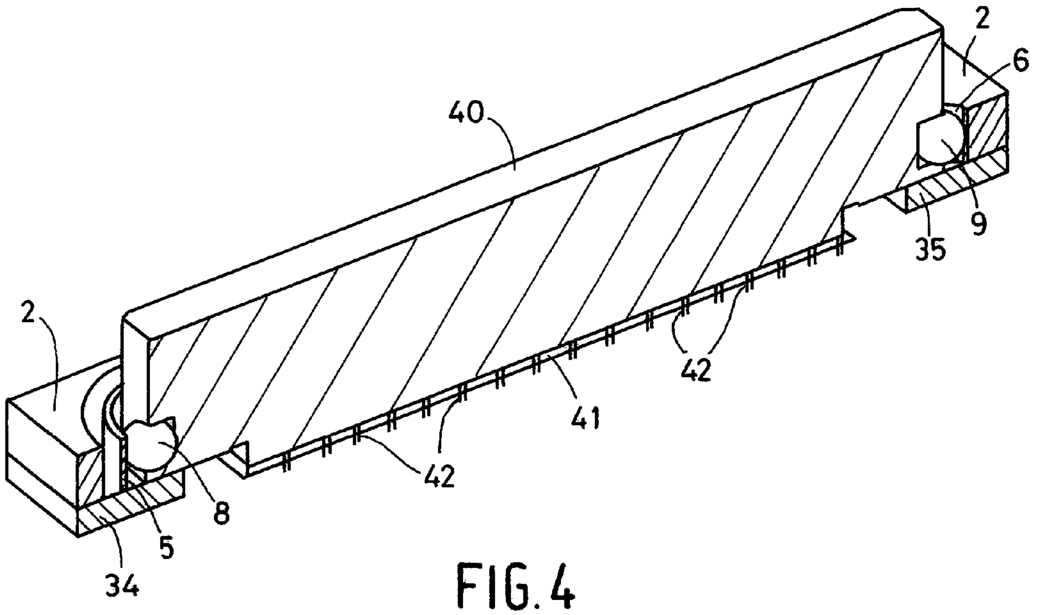
FIG. 4 is a perspective view of a cross-section taken along the line III-III of the device in FIG. 1 in which the object is a printhead.
Figure 5A:
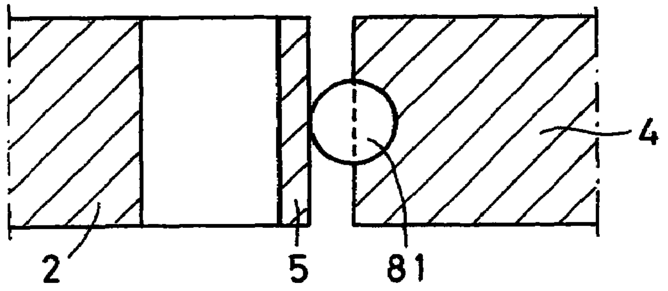
FIG. 5 shows some examples of spherical segments in cross-section taken along line III-III of the device in FIG. 1.
Figure 5B:
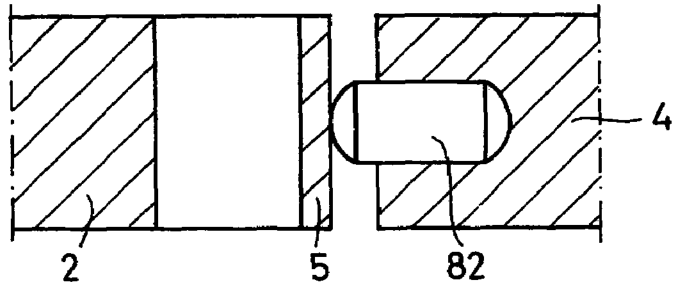
Figure 5C:
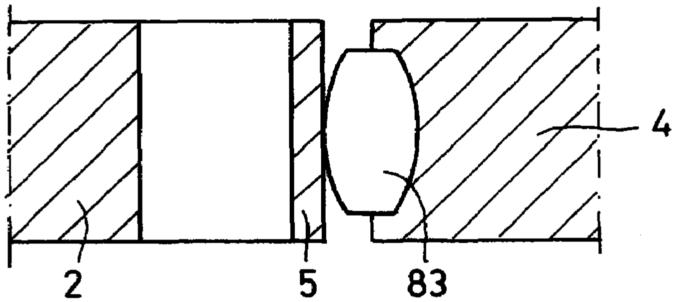
Figure 5D:
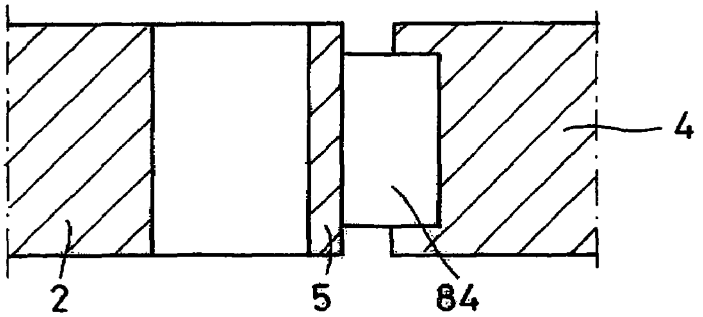

FIG. 4 is a perspective view of the cross-section on the line III-III of the device shown in FIG. 1, wherein the object is a printhead 40. A printhead 40 of this kind contains a quantity of ink and is used, inter alia, in inkjet printers. At the bottom, the printhead 4 is provided with a nozzle plate 41 containing a plurality of nozzles 42. By energising the printhead 40 imagewise, drops of ink are ejected in the direction of a sheet of receiving material moved along the nozzles (not shown), so that an image is formed on the receiving material. With regard to the quality of this image, it is important that the nozzle plate 41 should extend parallel with very high precision to the receiving material. This is achieved by positioning the printhead 40 with high accuracy with respect to the plane of the base frame 2. This accuracy must also be obtained with repeated use of such a printhead 40. With the principle described above for accurate positioning of an object on a frame, reproducibility is guaranteed. To obtain the above-described positioning on the base frame 2, the printhead 40 is provided with pressed-in balls 8 and 9.

During operation of the device for transferring an image onto a receiving material by means of a printhead 40, considerable temperature differences occur. Depending on the phase of the process, the printhead 40 will heat up very quickly or cool down very quickly. Different materials will expand or contract differently due to differences in coefficients of expansion, with the same heating and cooling. In order to keep the positioned printhead correctly positioned under these conditions, the device (1) can be provided with components which minimise the temperature transfer. For example, the device 1 can be provided with thermal insulating material, for example ceramic spherical segments and contact surfaces, at the contact points between the printhead 40 and the base frame 2, or by applying a thermally insulating coating to the said elements.

Apart from components for minimising the temperature differences within the device 1, the device 1 is also provided with components to control the differences in thermal expansion present. By fixing the expansion movement in all directions (X, Y and Z) on one side and offer stiffness on the opposite side, the positioning of the printhead 40 is retained despite differences in thermal expansion. For example, in the X-direction, the expansion of the printhead 40 is fixed by V-groove 6, while the leaf spring 5 offers stiffness and expansion possibilities.

In another embodiment (not shown), the base frame is provided with a spherical segment of the V-groove in the above-described embodiment, while the spherical segment of the printhead is replaced by a V-groove, so that the printhead is connected to the base frame via two contact points. On the opposite side, the base frame is provided with a spherical segment, while the printhead is constructed with a leaf spring, between which there is point contact.

Figure 6:
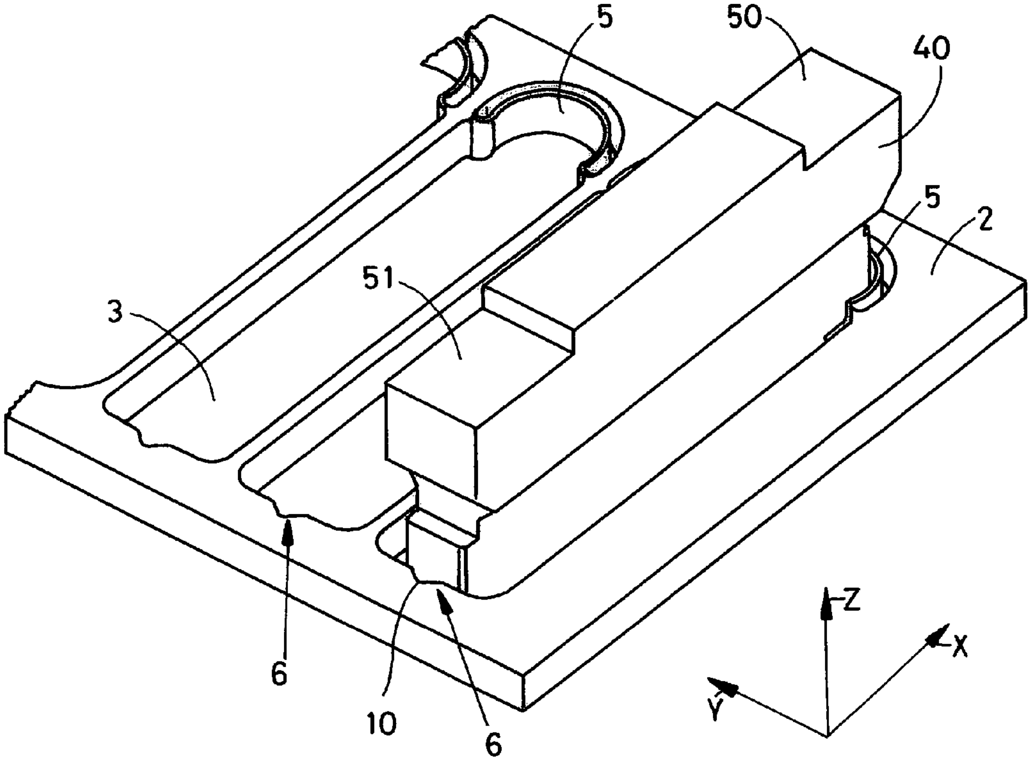
FIG. 6 is a perspective view of a set of devices as shown in FIG. 4.

FIG. 6 shows a combination of devices according to the present invention as found typically in inkjet applications. Various printheads 40 are positioned in a plurality of slots 3.

Figure 7:
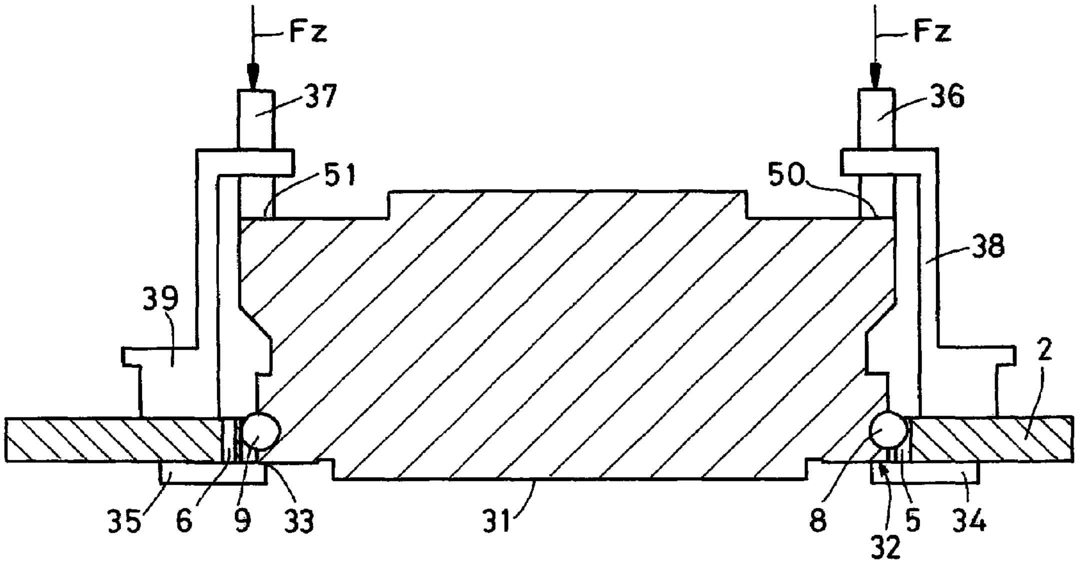
FIG. 7 is a side elevation of the device shown in FIG. 4 with the addition of means for the vertical positioning of the object.

In the above embodiments, only three of the six degrees of freedom are fixed, namely two translatory movements in the plane of the base frame 2 in the X and Y directions, and a rotational movement about the Z-axis perpendicular thereto. To be able to fix these degrees of freedom, the device 1 is provided, at the underside, with contact surfaces 34 and 35 as shown in FIGS. 1, 2 and 3. The way in which the degrees of freedom of the object are fixed depends on the geometry of the object. FIG. 7 illustrates one possibility of fixing these latter degrees of freedom of the printhead 40. In order to obtain correct positioning in the Z-direction, perpendicular to the plane of the base frame 2, and in rotational directions around two axes perpendicular to one another in the plane of the base frame 2, in the X and Y directions, the printhead 40 is provided, on the underside 31, with two smooth contact surfaces 32 and 33. These contact surfaces 32 and 33 are positioned on contact surfaces 34 and 35 made for the purpose and located on the base frame 2 and extending parallel to the plane of the base frame 2. By turning two screws 36 and 37 mounted rotatably in subframes 38 and 39 of the base frame 2 the printhead 40 is pressed, at contact surfaces 50 and 51, by the screws 36 and 37 on to contact surfaces 34 and 35 with a force perpendicular to the plane of the base frame 2 FZ. By applying this force FZ, a translatory movement is fixed in the vertical direction and two rotational movements about axes in the plane of the base frame. It is preferable for the force which fixes the vertical direction to be a pure force in the Z-direction. Any construction which imparts such a force FZ to the printhead 4 can be used here. In this embodiment, use is made of screws which at the contact side are provided with freely rotating spherical segments (not shown). As a result, no tangential force component is transmitted during the turning of the screws on the object at contact points 50 and 51 between the screws 36 and 37 and the printhead 40, and the force applied is directed in the pure Z-direction.

One example of application of a device according to the present invention as described above is a printer provided with a carriage for positioning a printhead in a slot of the carriage frame in a predetermined position with respect to a plane extending in the direction of the plane of the carriage (plane X-Y). The printhead includes a first spherical segment at a first side and a second spherical segment at a second side extending opposite the first side, and the carriage frame, includes at least one positioning means, which after placing the printhead exerts a force with a component in the radial and tangential direction on the printhead at the first spherical segment, the tangential component reaching a minimum in the situation in which the printhead is situated in the predetermined position and a recess in which the second spherical segment can be pressed by the positioning means. In another embodiment of the present invention, in the printer described above, an auxiliary means is provided in the carriage frame which prevents movements of the printhead in a direction perpendicularly out of the plane of the frame (Z-direction). The positioning means in the above-described embodiments of the printer, according to the present invention, can be constructed as a resilient element. In a printer according to the invention, the resilient element may be a symmetrically shaped curved leaf spring enclosing more than half of an arc of a circle. The curved leaf spring can be formed from the carriage frame material in a printer according to the invention. The recess in the above-described embodiments of the printer may be conical or formed as a V-groove.

Another example of an application of the device according to the present invention as described hereinbefore is a printer provided with a carriage for positioning a printhead in a slot of the carriage frame in a predetermined position with respect to a plane extending in the direction of the plane of the carriage (plane X-Y), the carriage frame having at the first side a first spherical segment and, at a second side opposite the first side, a second spherical segment. The printhead which includes a positioning means which exerts a force with a component in the radial and tangential direction on the printhead at the first spherical segment, the tangential component reaching a minimum in the situation in which the printhead is situated in the predetermined position, and a recess is provided in which the second spherical segment can be pressed by the positioning means. In a further embodiment of the present invention, an auxiliary means is mounted in the carriage frame in the above-described printer and prevents movements of the printhead in a direction perpendicularly out of the plane of the frame (Z-direction). The positioning means in the above-described embodiments of the printer can be constructed as a resilient element.

The resilient element in a printer according to the present invention may include a symmetrically shaped curved leaf spring enclosing more than half of an arc of a circle. The curved leaf spring in a printer can be formed from the carriage frame material. The recess in the above-described embodiments of the printer may be conical or formed as a V-groove.

In the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A device for positioning a printhead in an opening of a frame in a predetermined position with respect to a plane extending in the direction of the plane of the frame (plane X-Y), wherein the printhead includes a first spherical segment provided on a first side and a second spherical segment provided on a second side situated opposite the first side and the frame comprises a positioning means which, after placing the printhead, exerts a force with a component in the radial and tangential direction on the printhead at the first spherical segment, the tangential component reaching a minimum in the situation in which the printhead is situated in the predetermined position, and a recess in which the second spherical segment is pressed by the positioning means.

2. The device according to claim 1, wherein the frame includes auxiliary means, which prevent movements of the printhead in the direction perpendicularly out of the plane of the frame (Z-direction).

3. The device according to claim 1, wherein at the positioning means is a resilient element.

4. The device according to claim 3, wherein the resilient element is a curved leaf spring.

5. The device according to claim 4, wherein the curved leaf spring is symmetrically shaped and encloses more than one-half of an arc of a circle.

6. The device of claim 4, wherein straight elements are added to the positioning means.

7. The device according to claim 1, wherein the positioning means forms a unit with the frame and is formed from the work piece by machining.

8. The device according to claim 1, wherein the recess is formed as a V-groove.

9. The device according to claim 8, wherein the recess is conical.

10. The device of claim 1, wherein the positioning means provides a resilient, self-aligning surface for said printhead.

11. A device for positioning a printhead in an opening of a frame in a predetermined position with respect to an imaginary plane. extending in the direction of the plane of the frame (plane X-Y), the printhead including a first spherically shaped surface segment provided at a first side of the printhead and a second spherically shaped surface segment provided at a second side of the printhead said second side of the printhead being situated opposite said first side of the object, and wherein the frame comprises a recess configured to receive said second spherically shaped surface segment, said frame further comprising at least one positioning means which is configured to exert a force in the situation where the printhead is placed in the frame, said force having a component in the radial direction and the tangential direction on the printhead at said first spherically shaped surface segment, wherein the tangential component reaches a minimum in the situation in which the printhead is situated in the predetermined position.

12. the device according to claim 11, wherein the frame includes auxiliary means which prevents movements of the printhead in a direction perpendicularly out of the plane of the frame (Z-direction).

13. The device according to claim 11, wherein the positioning means comprises a resilient element.

14. The device according to claim 13, wherein the resilient element is a curved leaf spring.

15. The device according to claim 14, wherein the curved leaf spring is symmetrically shaped and encloses more than one-half of an arc of a circle.

16. The device of claim 14, wherein straight elements are added to the positioning means.

17. The device according to claim 11, wherein the positioning means forms a unit with the frame and is formed by machining from a work piece.

18. The device according to claim 11, wherein the recess is formed as a V-groove.

19. The device according to claim 11, wherein the recess is conical.

20. The device of claim 11, wherein the positioning means provides a resilient self-aligning surface for said printhead.

* * * * *